US 6,451,281 B1

(12) United States Patent
Ebeling et al.

(10) Patent No.: US 6,451,281 B1
(45) Date of Patent: Sep. 17, 2002

(54) METHODS OF MANUFACTURING MICRO-PARTICULATED HYDRATE SLURRIES

(75) Inventors: Joseph H. Ebeling, Ste. Genevieve, MO (US); Randy J. Griffard, St. Mary, MO (US); Mark G. DeGenova, Ste. Genevieve, MO (US)

(73) Assignee: Mississippi Lime Company, Ste. Genevieve, MO (US)

( * ) Notice: Subject to any disclaimer, the term of this patent is extended or adjusted under 35 U.S.C. 154(b) by 0 days.

(21) Appl. No.: 09/870,274

(22) Filed: May 30, 2001

(51) Int. Cl.[7] .................................. C01B 13/14
(52) U.S. Cl. ........................................ 423/640
(58) Field of Search ............................ 423/640

(56) References Cited

U.S. PATENT DOCUMENTS

| 5,277,491 A | 1/1994 | Burnett et al. |
| 5,378,374 A | 1/1995 | Anderson |
| 5,458,768 A | 10/1995 | Anderson |
| 5,746,983 A | 5/1998 | Stephansen |

FOREIGN PATENT DOCUMENTS

| CA | 1212825 | 10/1986 |
| DE | 3735951 | * 5/1989 |

OTHER PUBLICATIONS

DE 3735951 Maurer et al. Answer 124 of 426 of American Chemical Society "Chemical Abstract" One page English abstract—May 1989.*

Lime Slurry Neutralization System, Cotuit Water Department, Anderson Technology Corporation, 11 pgs. (1996).

Automatic Closed–Loop Control Lime Slurry Feed System, , Dr. L.D. McMullen, Director of Engineering Services, Des Moines Water Works, Des Moines, Iowa, 10 pgs. ( no date available).

The Importance of Lime Feed System Design In Emission Control Systems For Municipal Waste Combustors, Frank A. Morenski, Applications Engineer, Belco Technologies Corporation; Edwin H. Weaver, P.E., Manager, Applications and Technology, Belco Technologies Corporation, Mar. 28–30, (1990) 15 pgs.

Chemistry and Technology of Lime and Limestone, Second Edition, Robert S. Boynton, John Wiley & Sons, Inc., 22 pgs. (No Date Available).

Water Treatment, Wet–Slaking Speeds Lime Reactivity, Ralph L. Carr, Chief Chemist, BIF, Water & Sewage Works, Aug. (1976) 4 pgs.

The Hydration of Calcium Oxide and Dolomitic Lime, Chapter 6, 10 pgs. No Date Available.

(List continued on next page.)

*Primary Examiner*—Paul Marcantoni
(74) *Attorney, Agent, or Firm*—Armstrong Teasdale LLP

(57) ABSTRACT

A method of manufacturing micro-particulated hydrated lime slurries includes the steps of blending hydrated lime and water to form a mixture, mixing the hydrated lime and water mixture under high shear to form a slurry, transferring the hydrated lime and water slurry to a storage container, and adjusting the percent weight solids of the hydrated lime and water slurry to a predetermined weight solids content. Mixing the hydrated lime and water mixture under high shear can include mixing with a high shear disperser and/or with a high shear rotor/stator mixer. The resultant slurry includes hydrated lime particles with a median particle size of about 6 micrometers or less.

16 Claims, 3 Drawing Sheets

OTHER PUBLICATIONS

Chemical Reactivity and Other Relevant Properties of Milk of Lime as Applied In Water Treatment, D.J. Wiersma, P. Hubert, J.N. Bolle, Seilles, Belgium, 14 pgs. (No Date Available).

Improved milk–of–lime for softening of drinking water—the answer to the carry–over problem, M.W.M. van Eckeren, J.A.M. van Paassen and C.W.A.M. Merks, J. Water SKT—Aqua vol. 43. No. 1, 15 pgs., (1994).

Slaking System Design For Reactive Limes At Four Corners, D.P. Shelly and P.N. Gupta, United Engineers & Constructors, Inc., A.P. Simko and S.R. Travis, Arizona Public Service Company, 22 pgs. (No Date Available).

Use of Lime Water in Germany to Solve Handling and Water Quality Concerns Related to Lime Addition, Robert N. Jarnis, Associate, Camp Dresser & McKee, Inc., National Conference on Integrating Corrosion Control and Other Water Quality Goals, 18 pgs. (No Date Available).

Translation ZKG No. 8/76 (pp. 381–387), The rate of neutralization of wet or dry slaked hydrated limes as a function of their conditions of manufacture, H. Becker, Hahnstätten, and H. von Zander, Balduinstein, 7 pgs. (No Date Available).

The Use of $CO_2$ and Lime For Corrosion Control: Practical Aspects of Operations, Rocky Mountain Section America Water Works Association, (1994) Annual Conference, Kevin Gertig, Operations and Process Supervisor, Ken Carlson, Process Engineer, Fort Collins Water Utility, 8 pgs.

National Lime Association, 1995 Annual Convention, Palm Springs, California, May 6–11, (1995), Coffman Industries, Inc., Mr. Paul A. Coffman, Jr., P.E., President, Lime and Dry Chemical Feeding Systems Past, Present and Future, .Technical Data Useful for Designing of Lime Systems, 71 pgs.

\* cited by examiner

METHODS OF MANUFACTURING MICRO-PARTICULATED HYDRATE SLURRIES

BACKGROUND OF THE INVENTION

This invention relates generally to lime slurries, and more particularly to micro-particulated hydrated lime slurries.

Lime in the form of calcium hydroxide ($Ca(OH)_2$) is used extensively to treat water in potable water treatment plants and industrial wastewater and sludge plants. The lime is typically introduced into the process as a slurry, a paste, or as lime milk. Using the lime in a dry form usually creates dust problems that have to be overcome. To keep the processing costs low, lime slurries are typically prepared at the plant where they are to be used. This eliminates having to pay shipping costs for water which make up between 60% to 98% by weight of the lime slurry It is thought that the smaller the particle size of the lime in the slurry, the more reactive the lime slurry. It follows that the more reactive the lime, the less lime needed in a water treatment process, and consequently, the treatment plant can be smaller.

Lime is a generic term that is know in the art to mean either quicklime, CaO, or hydrated lime, $Ca(OH)_2$. Quicklime can be converted to $Ca(OH)_2$ by a slaking process where water and CaO are mixed under agitation and temperature to produce $Ca(OH)_2$ known as slaked lime. It is thought that slaked lime slurries contain smaller, more reactive $Ca(OH)_2$ particles than a lime slurry made by mixing water and hydrated lime. The theory is that the hydrated lime particles agglomerate thereby producing a lime slurry containing $Ca(OH)_2$ particles having less effective surface area than a slurry of slaked lime.

The size and quality of slaked lime particles in a slurry are dependent on a number of variables. Particularly, the reactivity, particle size, and gradation of the quicklime used influences the speed of slaking and the temperature of the slaking process. Other variables include the amount of water used, and the quality of the water, for example, the amount and type of water impurities, i.e., sulfites and sulfates. Further, the temperature of the water and the amount of agitation can affect slaked lime quality and particle size. To produce a consistent slaked lime requires controlling numerous process variable which can add to the cost of a water treatment plant.

Slurries made from hydrated lime do not require attention to as many process variable and are easier to produce than slaked lime slurries. To address the larger particle size through agglomeration of hydrated lime particles, it has been found that conditioning the hydrated lime slurry under agitation for 4 to 24 hours permits the agglomerates to break down to individual hydrated lime particles. However, this conditioning step is costly because of the extended processing time needed.

It would be desirable to provide hydrated lime slurries that includes hydrated lime particles as small as the slaked lime particles in slaked lime slurries and which do not require a 4 to 24 hour conditioning time.

BRIEF SUMMARY OF THE INVENTION

In an exemplary embodiment, a method of manufacturing micro-particulated hydrated lime slurries includes the steps of blending dry hydrated lime and water to form a mixture of at least 30 percent weight solids, and mixing the hydrated lime and water mixture under high shear to form a slurry. The method further includes transferring the hydrated lime and water slurry to a storage container, and adjusting the percent weight solids of the hydrated lime and water slurry to a predetermined weight solids content.

Mixing the hydrated lime and water mixture under high shear can include mixing the hydrated lime and water mixture with a high shear disperser and/or with a high shear rotor/stator mixer. The resultant slurry includes hydrated lime particles with a median particle size of about 6 micrometers or less.

An apparatus for manufacturing micro-particulated hydrated lime slurries includes a mixing container having a hydrated lime input port, a water input port, a high shear mixer, and a slurry output port. The high shear mixer includes a motor and a high shear blade or a high shear rotor/stator mixer head operatively coupled to the motor. The mixing container is mounted on at least one load cell to operatively determining the weight of the mixing container including any contents therein.

The apparatus further includes a storage tank having a mixing blade operatively coupled to a motor, a water inlet, a slurry inlet coupled to the mixing container slurry outlet by a slurry transfer pipe, and a slurry outlet. The slurry transfer pipe includes a transfer pump.

The above described method produces hydrated lime slurries that include hydrated lime particles that are as small as the slaked lime particles in a slaked lime slurry. Further, the hydrated lime slurries produced with the above described method have lower grit levels, are less abrasive, have a higher rate of solution, have a better consistency, are free of contaminates, and reduces scaling.

DETAILED DESCRIPTION OF THE INVENTION

Figure 1:
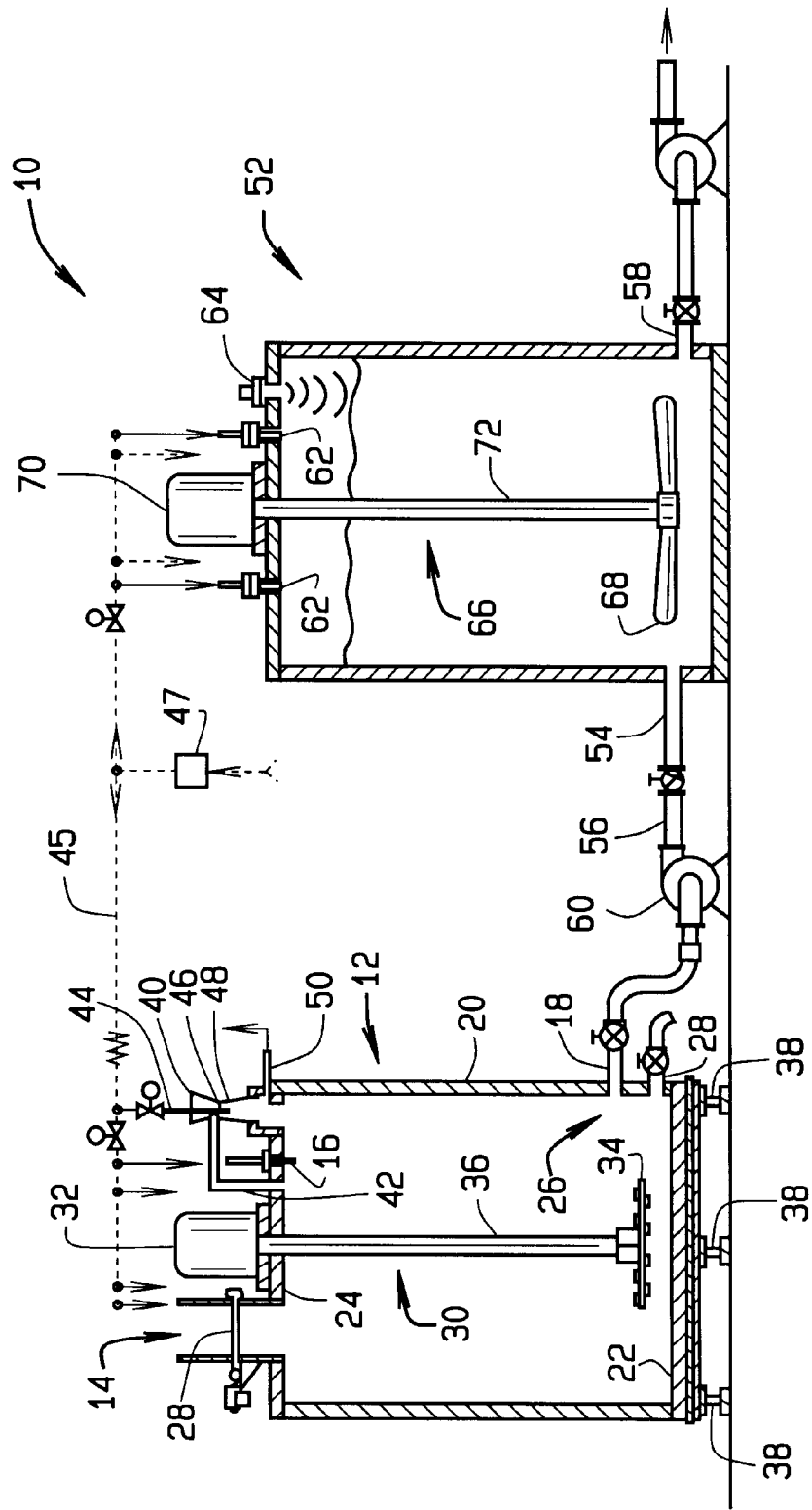
FIG. 1 is sectional schematic view of an apparatus for manufacturing micro-particulated hydrated lime slurries in accordance with an embodiment of the present invention.

FIG. 1 is sectional schematic view of an apparatus 10 for manufacturing micro-particulated hydrated lime slurries in accordance with an embodiment of the present invention. Apparatus 10 includes a mixing container 12 having a hydrated lime inlet port 14, a plurality of water inlet ports 16, or water spray nozzles 16 (one shown), and a slurry outlet port 18. Particularly, mixing container 12 has a cylindrical shape with a side wall 20, a bottom 22, and a top 24. Hydrated lime inlet port 14 and water input ports 16 are located in top 24. Slurry outlet port 18 is located in side wall 20 at a lower end portion 26 of side wall 20. A drain port 28 is also located in lower end portion 26. Of course in other embodiments, slurry outlet port 18 and/or drain port 28 can be located in bottom 22 of mixing container 12. A valve 29 is located in lime inlet port 14 and is used to meter hydrated lime into container 12. Valve 29 can also be used to close lime inlet port 14.

A high shear mixer 30 is mounted on top 24 mixing container 12. High shear mixer 30 includes a motor 32 and a high shear blade 34 operatively coupled to motor 32 by a rotatable shaft 34. High shear blades are sometimes referred to as high shear disc impellers. High shear mixers with high shear blades or disc impellers are commercially available from Morehouse-COWLES™, Fullerton, Calif., and Charles Ross & Son Company, Hauppauge, N.Y. Mixing container 12 is mounted on load cells 38 to operatively determining the weight of mixing container 12 including any contents therein.

To control dust in mixing container 12, a vacuum eductor 40 is located in top 24. A vacuum line 42 extends through top 24 and into vacuum eductor 38. A water line 44 is positioned in vacuum eductor 40 with an end 46 located in a venturi portion 48 of eductor 40. Water line 44 and water spray nozzles 16 are connected to a main water line 45. A water counter/meter 47 is attached to main water line for measuring and/or metering water flow in main water line 45. Vacuum eductor 40 also includes a vent 50. Water passing through venturi portion 48 creates a vacuum in line 42. The vacuum causes the dust in container 12 to be carried through vacuum line 42 to eductor 40 where the hydrated lime dust is mixed with water from water line 44 and returned to mixing container 12.

Apparatus 10 further includes a storage tank 52 having a slurry inlet port 54 coupled to slurry outlet port 18 of mixing container 12 by a slurry transfer pipe 56, and a slurry outlet port 58. Slurry transfer pipe 56 includes a transfer pump 60. Storage tank 52 includes a plurality of water inlets, or spray nozzles 62 (two shown), a level sensor 64, and a mixer 66. Mixer 66 includes a mixing blade 68 operatively coupled to a motor 70 by a rotatable shaft 72.

Figure 2:
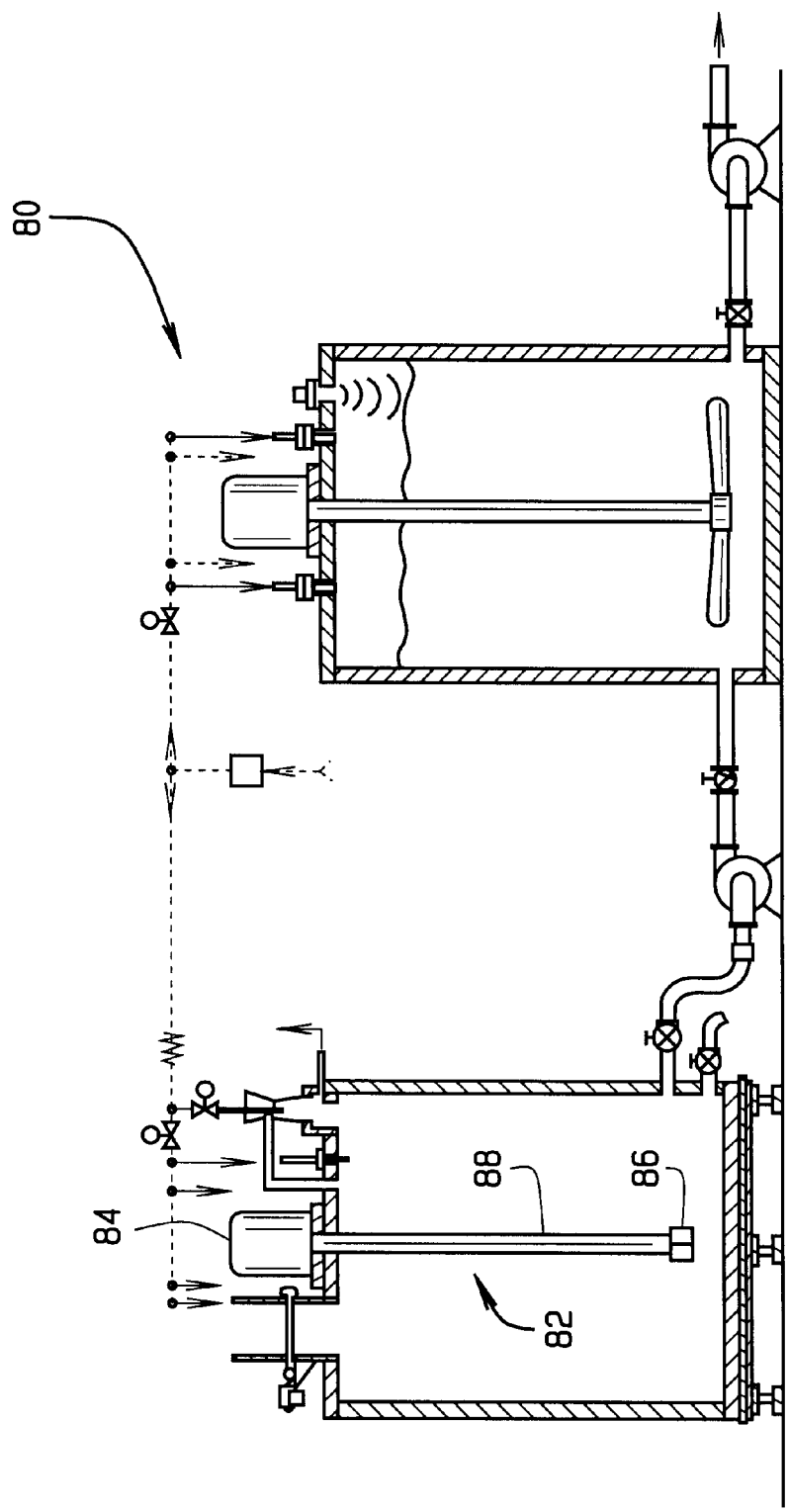
FIG. 2 is sectional schematic view of an apparatus for manufacturing micro-particulated hydrated lime slurries in accordance with another embodiment of the present invention.

FIG. 2 is sectional schematic view of an apparatus 80 for manufacturing micro-particulated hydrated lime slurries in accordance with another embodiment of the present invention. Apparatus 80 is identical to apparatus 10 described above except that high shear mixer 30 of apparatus 10 is replaced in apparatus 80 with a high shear mixer 82 that includes a motor 84 and a high shear rotor/stator mixer head 86 operatively coupled to motor 84 by a rotatable shaft 88. High shear mixers with high shear rotor/stator mixer heads are commercially available from Charles Ross & Son Company, Hauppauge, N.Y.

Figure 3:
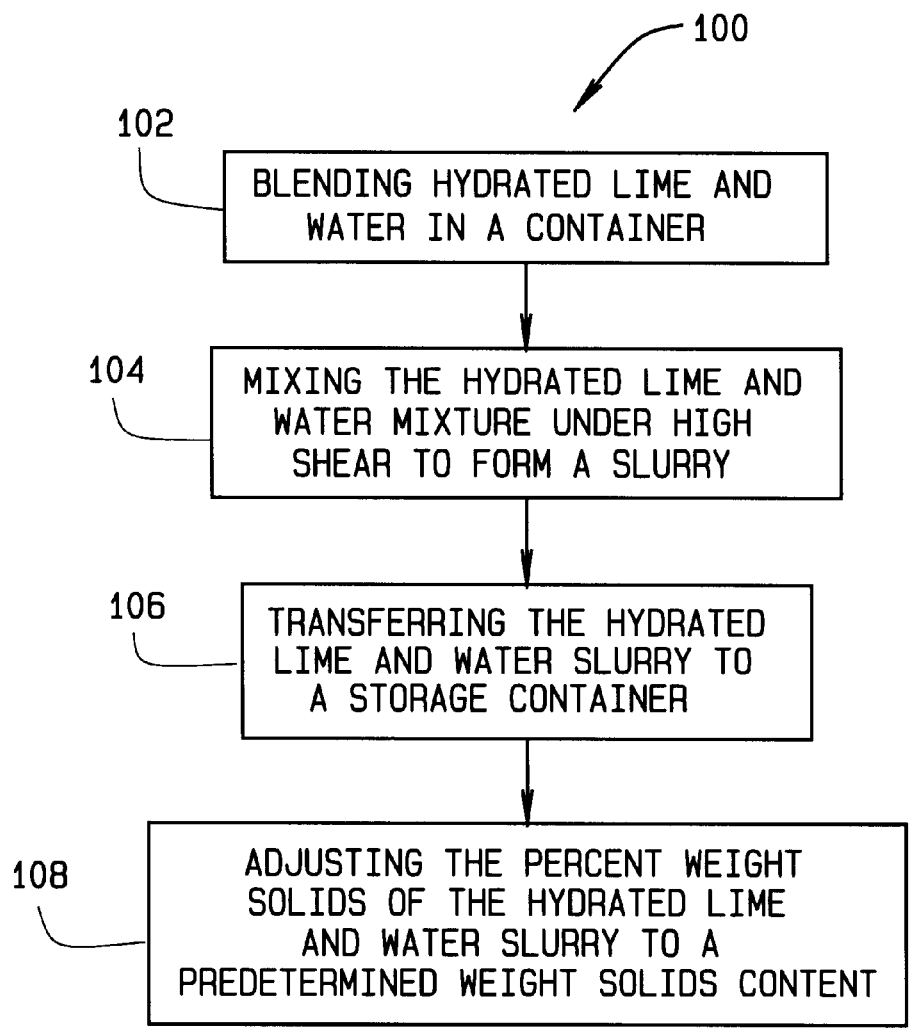
FIG. 3 is a flow chart of a method of manufacturing micro-particulated hydrated lime slurries in accordance with an embodiment of the present invention.

FIG. 3 is a flow chart of a method 100 of manufacturing micro-particulated hydrated lime slurries in accordance with an embodiment of the present invention. In an exemplary embodiment, method 100 includes blending 102 hydrated lime and water in any suitable mixing container, for example, mixing container 12, and mixing 104 the hydrated lime and water mixture under high shear to form a slurry. The hydrated lime and water are blended 102 to form a mixture of at least 30 percent weight solids. Lower weight solids mixtures of hydrated lime and water can cause scale deposits to form on the equipment.

Mixing 104 the hydrated lime and water mixture under high shear is accomplished with high shear mixer 30 or 82, described above. The high shear forces break up any hydrated lime agglomerates that are formed when the hydrated lime and water are blended together. In alternate embodiments, other means of imparting high shear forces on the hydrated lime and water mixture can be used, for example, roller mills, ball and pebble mills, and attriters using glass bead or zirconium bead grinding media.

The resultant slurry, in one embodiment, includes hydrated lime particles with a median particle size of about 6 micrometers or less. In another embodiment, the resultant slurry includes hydrated lime particles with a median particle size of about 0.5 micrometers to about 5 micrometers.

In still another embodiment, the resultant slurry includes hydrated lime particles with a median particle size of about 4 micrometers or less. The particle size distribution of the wet hydrated lime particles can be measured by any suitable particle size measurement apparatus, for example a Sedigraph Model 5100 Particle Size Analyzer commercially available from Micomeritics, Instrument Corporation, Norcross, Ga. The Sedigraph Model 5100 Particle Size Analyzer determines particle size by an X-ray/sedimentation method which measures the gravity-induced settling rates of different size particles in a liquid of known properties.

Method 100 further includes transferring 106 the hydrated lime and water slurry to a storage container, for example, storage tank 52, and adjusting 108 the percent weight solids of the hydrated lime and water slurry to a predetermined weight solids content. In one embodiment the hydrated lime and water slurry is adjusted to between 20 percent and 60 percent weight solids.

In alternate embodiments, the steps of transferring 106 the hydrated lime and water slurry to a storage container and adjusting 108 the percent weight solids of the hydrated lime and water slurry can be performed in a different order. For example, in an exemplary alternative embodiment, adjusting 108 the percent weight solids of the hydrated lime and water slurry is performed in mixing container 12 before transferring 106 the hydrated lime and water slurry. In another exemplary alternate embodiment, adjusting 108 the percent weight solids of the hydrated lime and water slurry is performed in mixing container 12 before transferring 106 the hydrated lime and water slurry and in storage tank 52 after transferring 106 the hydrated lime and water slurry to storage container 52.

The above described method 100 and apparatus 10 and 80 produce hydrated lime slurries that include hydrated lime particles that are as small as the slaked lime particles in a slaked lime slurry. Further, the hydrated lime slurries produced with the above described method 100 and apparatus 10 and 80 have lower grit levels, are less abrasive, have a higher rate of solution, have a better consistency, are free of contaminates, and reduces scaling While the invention has been described in terms of various specific embodiments, those skilled in the art will recognize that the invention can be practiced with modification within the spirit and scope of the claims.

What is claimed is:

1. A method of manufacturing micro-particulated hydrated lime slurries comprising the steps of:

blending, in a mixing container, dry hydrated lime and water to form a mixture of at least 30 percent weight solids;

mixing the hydrated lime and water mixture under high shear at a rate effective to form a slurry of hydrated lime particles with a median particle size of about 6 micrometers or less; and adjusting the percent weight solids of the hydrated lime and water slurry to between 20 percent and 60 percent weight solids content.

2. A method in accordance with claim 1 further comprising:

transferring the hydrated lime and water slurry to a storage container before adjusting the percent weight solids of the hydrated lime and water slurry to between 20 percent and 60 percent weight solids content.

3. A method in accordance with claim 1 wherein mixing the hydrated lime and water mixture under high shear comprises the step of mixing the hydrated lime and water mixture with a high shear disperser.

4. A method in accordance with claim 1 wherein mixing the hydrated lime and water mixture under high shear comprises the step of mixing the hydrated lime and water mixture with a high shear rotor/stator mixer.

5. A method in accordance with claim 1 wherein the slurry of hydrated lime and water comprises hydrated lime particles with a median particle size of about 4 micrometers or less.

6. A method in accordance with claim 1 wherein the slurry of hydrated lime and water comprises hydrated lime particles with a median particle size of about 0.5 micrometers to about 5 micrometers.

7. A method in accordance with claim 1 wherein the mixing container comprises at least one load cell, and blending, in a mixing container, hydrated lime and water to form a mixture of at least 30 percent weight solids comprises the steps of:

weighing the amount of hydrated lime added to the mixing container with the at least one load cell;

adding a weight of water to the mixing container to obtain a hydrated lime mixture of at least 30 weight percent solids.

8. A method of manufacturing micro-particulated hydrated lime slurries comprising the steps of:

blending, in a mixing container, dry hydrated lime and water to form a mixture of at least 30 percent weight solids; and mixing the hydrated lime and water mixture under high shear at a rate effective to form a slurry comprising hydrated lime particles with a median particle size of about 6 micrometers or less.

9. A method in accordance with claim 8 further comprising adjusting the percent weight solids of the hydrated lime and water slurry to between 20 percent and 60 percent weight solids content.

10. A method in accordance with claim 9 further comprising transferring the hydrated lime and water slurry to a storage container.

11. A method in accordance with claim 10 wherein adjusting the percent weight solids of the hydrated lime and water slurry is performed after transferring the hydrated lime and water slurry to a storage container.

12. A method in accordance with claim 10 wherein adjusting the percent weight solids of the hydrated lime and water slurry is performed both before and after transferring the hydrated lime and water slurry to a storage container.

13. A method in accordance with claim 8 wherein mixing the hydrated lime and water mixture under high shear comprises the step of mixing the hydrated lime and water mixture with a high shear disperser.

14. A method in accordance with claim 8 wherein mixing the hydrated lime and water mixture under high shear comprises the step of mixing the hydrated lime and water mixture with a high shear rotor/stator mixer.

15. A method in accordance with claim 8 wherein the slurry of hydrated lime and water comprises hydrated lime particles with a median particle size of about 4 micrometers or less.

16. A method in accordance with claim 8 wherein the slurry of hydrated lime and water comprises hydrated lime particles with a median particle size of about 2 micrometers to about 5 micrometers.

* * * * *